United States Patent [19]

Okamoto et al.

[11] Patent Number: 4,628,436
[45] Date of Patent: Dec. 9, 1986

[54] DIGITAL CONTROLLER

[75] Inventors: Tadashi Okamoto; Hiromasa Yamaoka, both of Hitachi, Japan

[73] Assignee: Hitachi, Ltd., Tokyo, Japan

[21] Appl. No.: 582,541

[22] Filed: Feb. 22, 1984

[30] Foreign Application Priority Data

Feb. 24, 1983 [JP] Japan ................... 58-28541

[51] Int. Cl.⁴ .............. G06F 15/16; G06F 9/00
[52] U.S. Cl. .................... 364/131; 364/134; 364/200
[58] Field of Search ............... 364/131–136, 364/200 MS File

[56] References Cited

U.S. PATENT DOCUMENTS

| | | | |
|---|---|---|---|
| 3,364,472 | 1/1968 | Sloper | 364/200 |
| 3,787,673 | 1/1974 | Watson et al. | 364/200 X |
| 4,128,876 | 12/1978 | Ames et al. | 364/200 |
| 4,338,675 | 7/1982 | Palmer et al. | 364/200 X |
| 4,366,535 | 12/1982 | Cedolin et al. | 364/200 |
| 4,428,043 | 1/1984 | Catiller et al. | 364/200 |
| 4,438,488 | 3/1984 | Shibayama et al. | 364/200 |

FOREIGN PATENT DOCUMENTS

1456941 12/1976 United Kingdom .

*Primary Examiner*—Joseph Ruggiero
*Attorney, Agent, or Firm*—Antonelli, Terry & Wands

[57] ABSTRACT

A digital controller for controlling a plurality of processes. In view of the fact that in case a plurality of processes of a like nature are to be controlled, same operands are used for performing a similar arithmetic operation a number of times, instructions are stored in a common memory for simplifying the programming, while the operands are stored in memories each incorporated in each of the processors adapted for controlling individually the objective processes, to thereby allow arithmetic processings to be performed by the processors in parallel with one another. Overall processing speed is made thus significantly high.

3 Claims, 13 Drawing Figures

DIGITAL CONTROLLER

BACKGROUND OF THE INVENTION

The present invention generally relates to a digital controller of the type used for process controls or the like. More particularly, the invention concerns a digital controller which can be advantageously used for process control in which a plurality of processes are to be controlled by performing arithmetic processings of a like type or nature.

The control of plural objectives by means of a digital controller has the disadvantage that the overall processing speed becomes slow in proportion to the number of the objectives to be controlled, when the control is performed serially on a time division basis. With the present invention, it is intended to provide a digital controller which is capable of controlling a number of objectives with high speed through parallel arithmetic processings.

For performing high speed arithmetic processings, it has been known to use a parallel arithmetic processing procedure. Among others, the procedure disclosed in U.S. Pat. No. 3,364,472 may be mentioned, which concerns a parallel network type computer system. In addition to the network system, other parallel arithmetic processing systems are known.

Further, a technique for performing parallel logic operations and equipment for performing data logic analysis by computer hardware processing are disclosed in G.B. Pat. No. 1,456,941. This patent concerns a parallel processing system for data processing in which a plurality of functional units process data in an overlapping manner in accordance with a predetermined instruction sequence.

In recent years, as the various processes and systems become more sophisticated in scale and performance, there arises a demand for a programmable controller having high speed and high reliability for controlling such processes and systems. Heretofore, efforts for realizing a high speed operation have been made primarily in connection with the hardware structure of a microcomputer. However, a limitation will be imposed on further development of the hardware which permits higher operation speed, not to speak of the manufacturing cost. As a system which is designed to assure a high speed operation and high reliability, there may be mentioned a multi-processor system. However, the conventional multi-processor system is so arranged that the individual processors perform independent processings in parallel. As a consequence, the waiting time in reading a program through a common bus presents a problem. Besides, time loss due to the overhead of a control program for supervisory control of the multi-processor system gives rise to another problem, providing an obstacle to realization of the expected high speed operation. In case the processings have to be performed by controlling the timing among the processors, the waiting time involved among the processors as well as the complicated program for maintaining synchronism among operations of the processors provides disadvantages. In case the outputs of the individual processors of the multi-processor system have to be compared with one another for assuring an increased reliability, it is necessary to provide the erroneous operation detecting period with a margin for disposing of any timing difference among the processors, thereby involving further complexity and rendering it impossible to accomplish detection with high precision, with results in other disadvantages.

SUMMARY OF THE INVENTION

It is a primary object of the present invention to provide a digital controller for effecting process control with improved high processing speed.

Another object of the invention is to improve the processing speed of the digital controller adapted to control simultaneously a plurality of objectives or processes.

For accomplishing the above objects, the present invention starts from the fact that when a plurality of processes or objectives of a like nature are controlled, a number of like arithmetic or logic operations (equal to the number of the objectives or processes to be controlled) are often performed by using the same operands and proposes that an instruction be stored in a common memory while the operands are stored in memories incorporated in the processors, respectively, and which are provided separately for the objectives or processes to be controlled.

According to another aspect of the invention, the processors each provided for each of the objectives or processes to be controlled are controlled by a common control circuit.

According to a further aspect of the invention, a dummy processing (no operation) is effected for those of the objectives or processes for which the like arithmetic or logic processing is not required, to thereby maintain the parallel processing consistently.

BRIEF DESCRIPTION OF THE DRAWINGS

The present invention will be apparent from the following detailed description taken in conjunction with the accompanying drawings, in which.

DESCRIPTION OF THE PREFERRED EMBODIMENT

Figure 1:
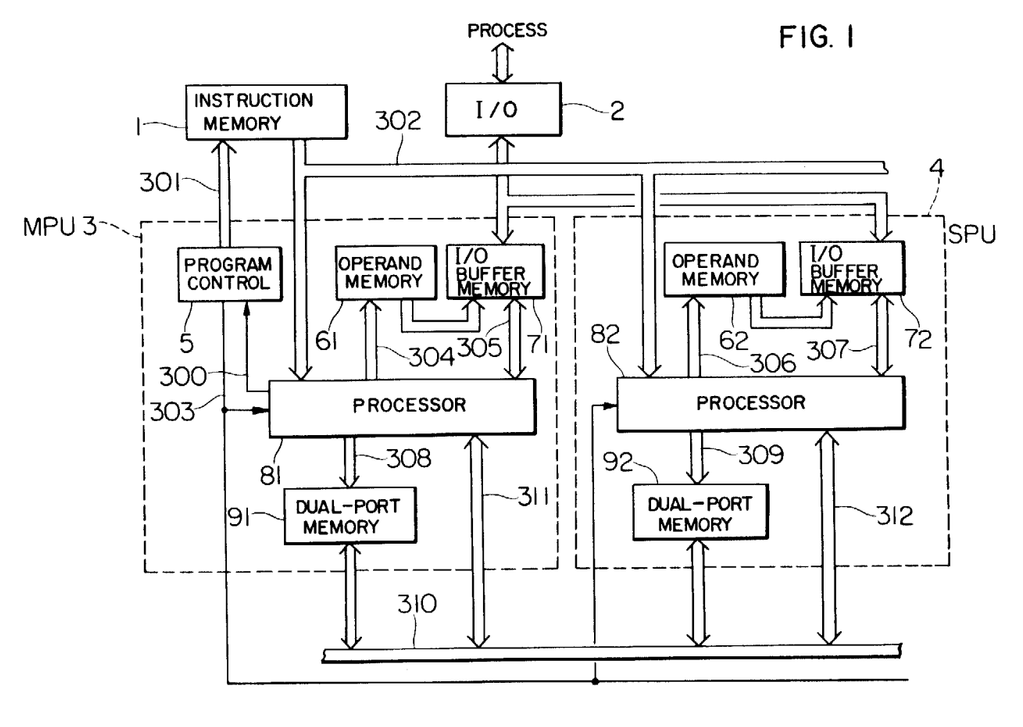
FIG. 1 is a block diagram showing a general arrangement of the controller according to an embodiment of the invention.

Now, the invention will be described in more detail in conjunction with an exemplary embodiment shown in FIG. 1. For simplification of description, it is assumed that two processing units, i.e. master processing unit (hereinafter referred to as a MPU) 3 and a slave processing unit (hereinafter referred to as a SPU) 4 are provided and share between them an instruction memory 1 and an input/output device 2 for inputting/outputting process signals, wherein the MPU and SPU are operated in parallel in accordance with a program placed in the instruction memory 1 to control processes in concern through the input/output device 2. In the case of the digital controller illustrated in FIG. 1, it is assumed that the number of the objectives or processes to be controlled is two. However, the number of the objectives to be controlled may be increased by correspondingly increasing the number of SPU's. Although the objective to be controlled is expressed simply by the term "process" in conjunction with the embodiment shown in FIG. 1, it will be understood that a plurality of control objects or objectives of like type or nature may be connected to the digital controller.

More specifically, the MPU 3 and SPU 4 include, respectively, processors 81 and 82, operand address memories 61 and 62, input/output buffer memories 71 and 72, and dual-port memories 91 and 92. The MPU 3 is further provided with a program controller 5. The operand address memories 61 and 62 serve to store the addresses which designate the operands in the input-/output bufer memories 71 and 72 on the basis of the indirect address of an instruction stored in the instruction memory 1, while the input/output buffer memory 71 and 72 serve as the buffer for a main memory of the input/output device 2 in realizing a high speed operation. Further, the dual-port memories 91 and 92 are provided for allowing the direct data transfer to be effected between the MPU 3 and the SPU 4.

Figure 2:
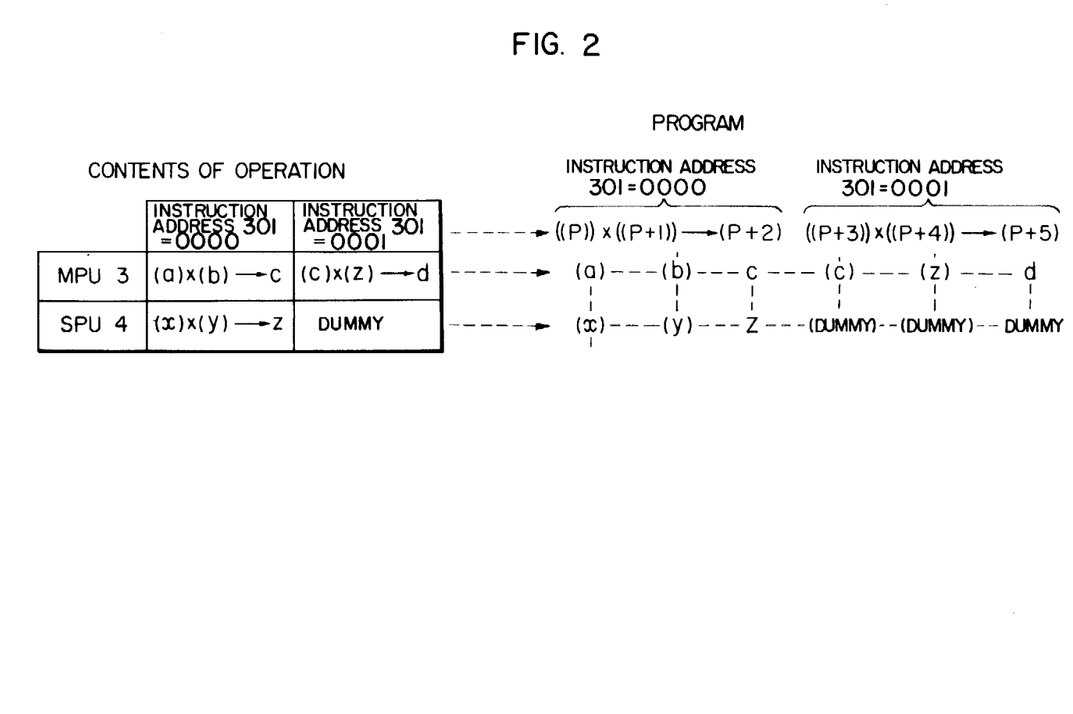
FIGS. 2 and 3 are views for illustrating contents of arithmetic operations and assignment of addresses of memories.

FIG. 2 shows a program for executing two sets of multiplications through the parallel processing. By referring to this figure, the basic control for the parallel processing and functions of the various memories in the digital controller shown in FIG. 1 will be described in more detail.

There is illustrated in FIG. 2 the relationship between the contents of various arithmetic operations and the instruction addresses. The MPU 3 is instructed to execute an arithmetic operation of "(a)×(b)→c" at the address "0000" by the instruction address signal 301, where (a) and (b) represent the stored contents at addresses a and b, respectively. With the above expression, it is meant that the contents at the addresses a and b should be multiplied with each other and the resulting product be stored at an address c. Similarly, the SPU 4 is also instructed to perform the arithmetic operation of "(x)×(y)→z" by the instruction signal 301 of the address "0000".

On the other hand, when the instruction address signal 301 designates the address "0001", arithmetic operation of "(c)+(z)→d" is executed in the MPU 3. With this expression, it is meant that the contents at the addresses c and z are to be added and the resulting sum is to be stored at the address d. At that time, however, data to be processed by the SPU 4 is absent notwithstanding the presence of the instruction for addition. Accordingly, the SPU 4 performs a dummy operation (or no operation). Corresponding program memory addresses are expressed by ((P))×((P+1))→(P+2) and ((P+3))+((P+4)→(P+5), respectively, by way of illustrative example, where double parenthesis (( )) represents the contents at the address denoted therein. The stored states of these instructions and the relevant operands will be described by referring to FIG. 3. The instruction memory 1 stores at the address of e.g. "0000" an instruction code indicating the multiplication and the leading address P of the operand addresses memories at which the operand addresses are stored.

The address P used for the indirect addressing designates the addresses of the operand address memories 61 and 62, respectively. The contents at the addresses of the memories 61 and 62 designated by the indirect address P are the addresses a and x, respectively. Considering the correspondence to the program addresses, the content of the memory 61 at the address P equals (P) and thus equals a, while content of the memory 62 at the address P equals (P) and thus equals x. In correspondence with the addresses a and x, data in the input/output buffer memories 71 and 72, i.e. the real operands, are designated. In the case of the illustrative example shown in FIG. 3, the data stored in the buffer memory 71 at the address a is "10", while the data stored in the buffer memory 72 at the address x is "3". The similar applies to the succeeding addresses (P+1) and (P+2) of the operand address memories 61 and 62. In this manner, the illustrated embodiment is so arranged that the operands for the processing units 3 and 4 can be simultaneously designated by the single indirect address P of the program.

Figure 3:
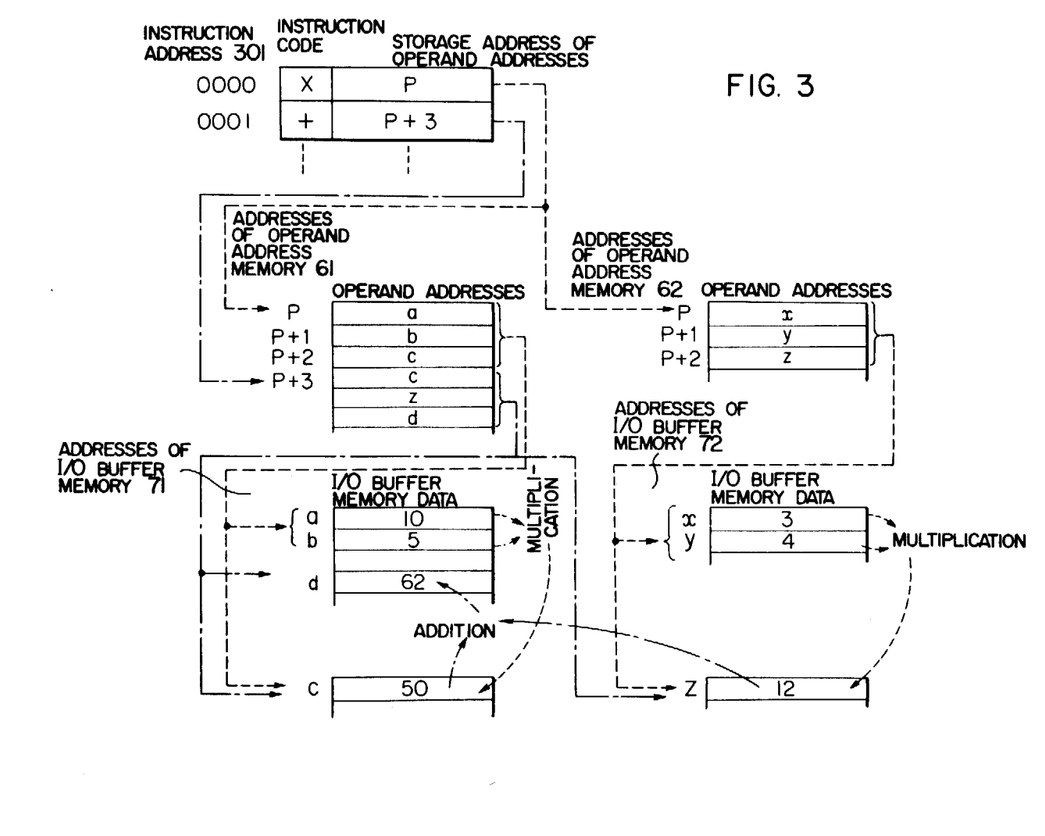
Figure 4:
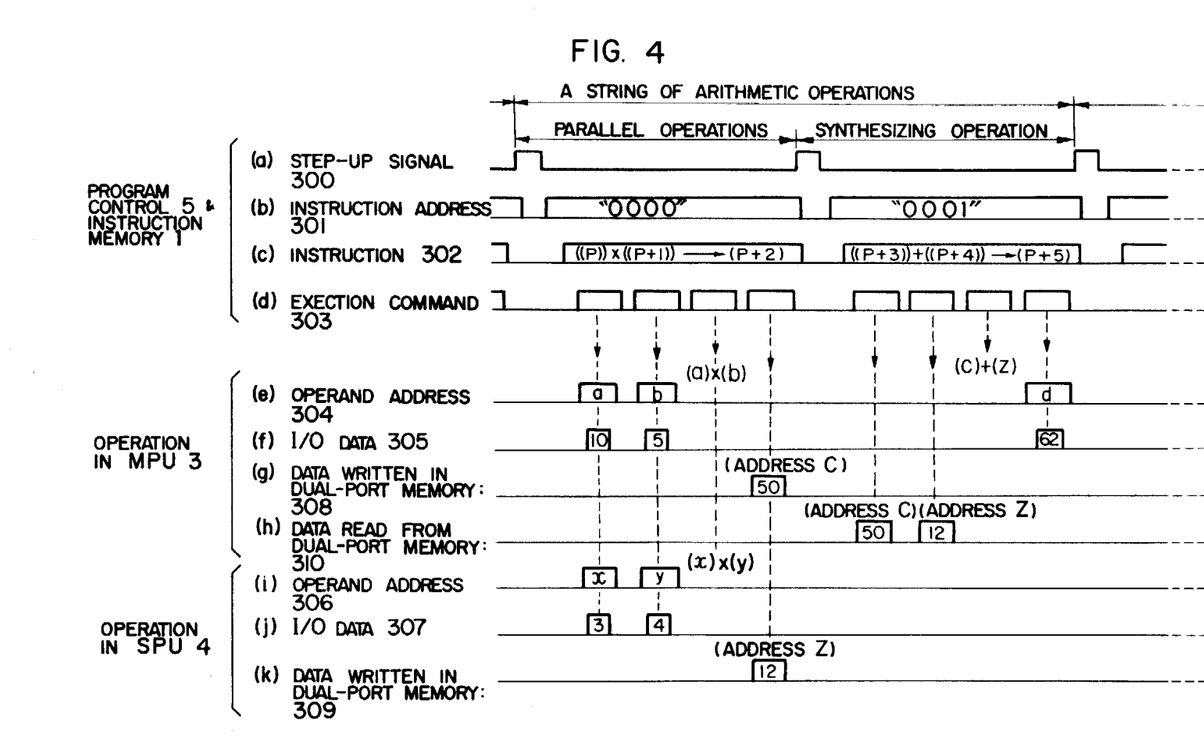
FIG. 4 shows a time chart for illustrating operation of the controller in conjunction with FIGS. 2 and 3.

FIG. 4 shows a time chart for illustrating the operations described above for the assumed example illustrated in FIGS. 2 and 3. When the instruction address signal 301 is updated in response to a step-up signal 300 to allow the succeeding instruction signal 302 to be read out, the execution timing is established by an execution command signal 303. Namely, the MPU 3 responds to the execution command signal 303 to fetch the input-/output data 305, i.e. "10" from the address a designated by the operand address 304. In the similar manner, data "5" is read out from the address b, whereby the arithmetic operation of (a)×(b) is performed by the MPU 3. The result of the operation is stored in the input/output buffer memory at the address c. It will be appreciated without any further description that the SPU 4 performs the similar operation, the result of which is written in the dual-port memory 91 or 92. The value stored in the memory 91 or 92 is read out, as occasion requires, to be utilized in the operations performed by other processors. For example, this corresponds to the operation in which "50" at the address c is added with "12" at the address z, the resulting sum "62" being stored at the address d, as shown in FIG. 3. This operation is effected by way of an address read-out signal bus 311 (or 312) of the dual-port memory of the other processor. The time chart shown in FIG. 4 is depicted on the assumption that the arithmetic operation is performed by way of the dual-port memory in this manner.

Next, the arithmetic operation performed according to the teaching of the invention as described above will be compared with that of the conventional parallel computation system. It is assumed that the conventional parallel computation system is of such a structure as schematically shown in FIG. 5 and includes processors or MPUs 3a and 3b and instruction memories 1a and 1b provided in association with these processors, respectively.

Figure 5:
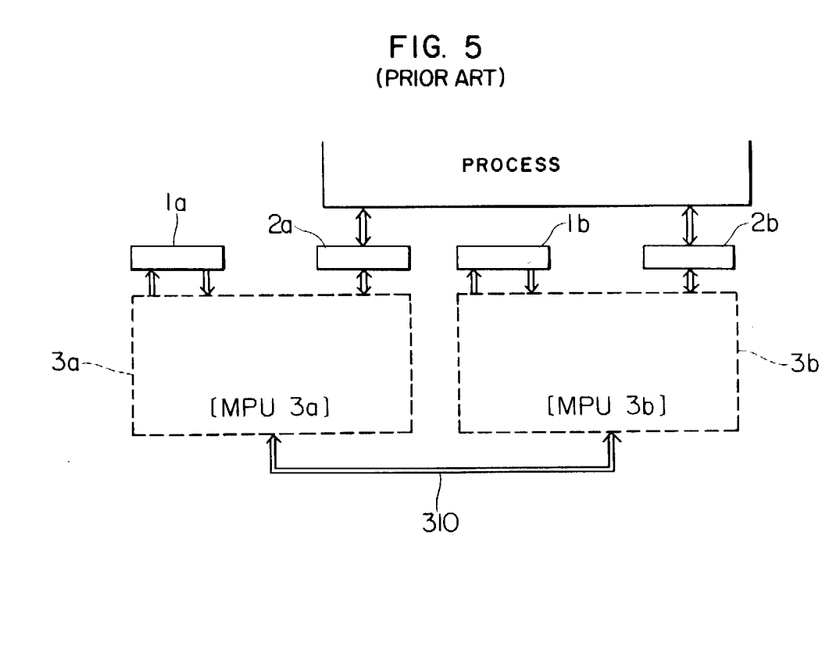
FIG. 5 is a block diagram showing a hitherto known parallel computation system for comparison with the controller according to the invention.
Figure 6:
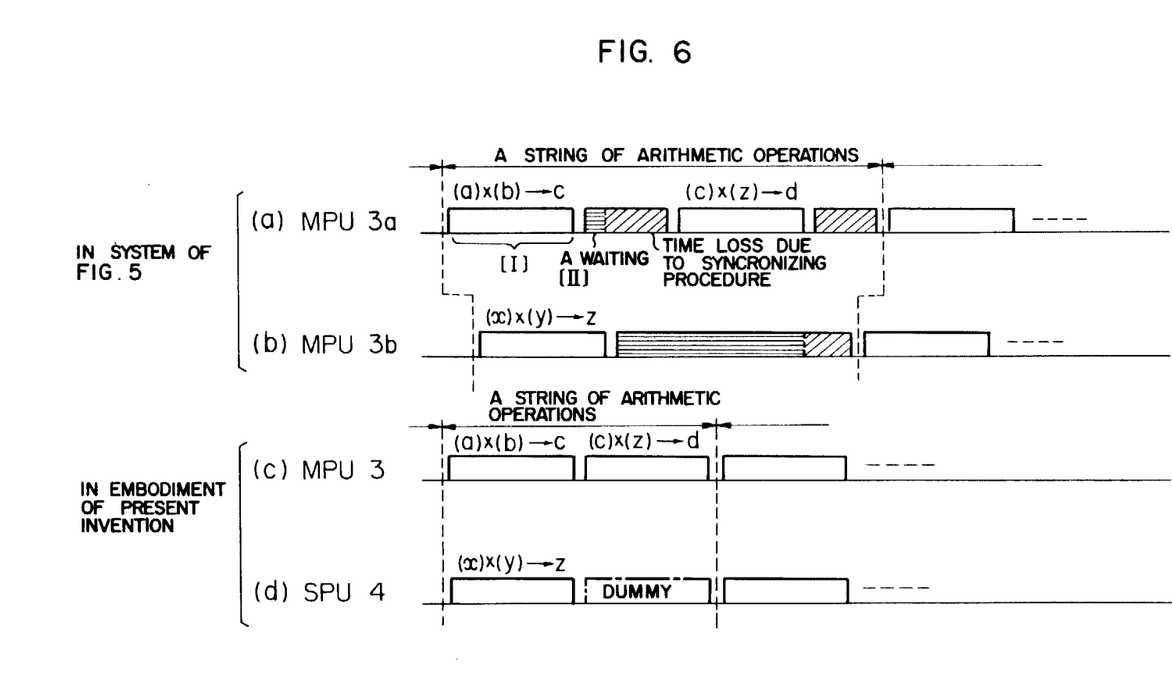
FIG. 6 is a time chart for illustrating the operation of the controller according to the invention by comparing its operation with that of the hitherto known parallel computation system.

FIG. 6 shows a time chart for illustrating the parallel computation processings effected in the manner described above in conjunction with FIGS. 1, 2 and 3 in comparison with the parallel computation processings performed by the MPU 3a and 3b shown in FIG. 5. In FIG. 6, [I] denotes a period in which an instruction is executed, [II] denotes a time interval for which completion of the operation performed by the counterpart processor is awaited, and [III] denotes a time loss involved by the procedure for synchronization. Since there exist a number of points at which the synchronization may be established, data is required for determining at which point the synchronization is to be established. The time required for the data transfer and determination of the synchronizing point is regarded as a loss in time or dead time when considered from the standpoint of execution of the instruction. In contrast to the conventional parallel computation system, instructions can be executed successively with the dead time intervals [II] and [III] being reduced to a minimum in the case of the processing system according to the illustrated embodiment of the invention, as will be seen from FIG. 6.

Figure 7:
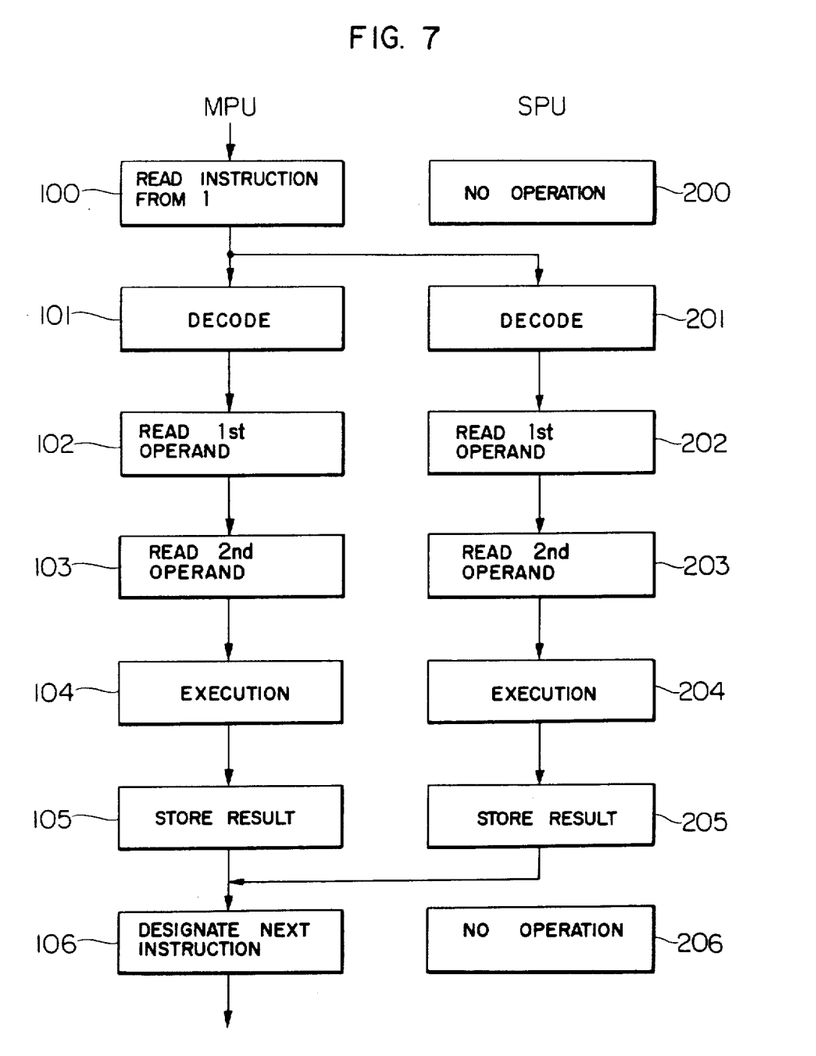
FIG. 7 is a flow chart for illustrating the flows of processings in carrying out the invention.

FIG. 7 illustrates in a flow chart a procedure for parallel-processing the data shown in FIG. 3 for the two multiplications shown in FIG. 2 by the system according to the illustrated embodiment of the invention. At a step 100, the instruction (FIG. 3) is read out from the instruction memory 1 at the address "0000" under command of the program controller 5 incorporated in the MPU 3. At that time, the SPU 4 is in the stand-by state (step 200). At steps 101 and 201, the processors 3 and 4 fetch and decode the instruction. Since the instruction code resulting from the decoding indicates the multiplication operation, it is determined that two operands must be fetched and that the result of the operation are to be stored at another address. Accordingly, succeeding steps 102 and 103 correspond to the operand fetching operation of the MPU 3. More specifically, at the step 102, the address a is read out from the address P of the memory 61, followed by the reading of the content "10" from the address a of the buffer memory 71 as the operand, which is then loaded in a register incorporated in the processor 81. At the step 103, the address b is read out from the address (P+1) of the operand memory 61, which is followed by reading the operand "5" from the address b of the buffer memory 71. In parallel with the steps 102 and 103, data $(x)=3$ and $(y)=4$ are fetched by the processor 82 of the SPU 4 at steps 202 and 203. At the steps 104 and 204, the multiplications are concurrently performed by the processors 81 and 82. At steps 105 and 205, the results of the multiplications are stored, respectively, in the buffer memories 71 and 72 at the addresses c and z designated by the indirect address P+2 (the designation of the addresses are realized in the similar manner as the operand fetching steps), whereupon the parallel processing for one set of the multiplications comes to an end. At a step 106, the control is regained by the program controller 5 and the address is incremented by "1", whereby the procedure proceeds to the execution of the instruction stored at the address "0001" of the instruction memory 1. However, in the case of a jump, address calculation and the like are performed at this step. At that time, the SPU 4 is in the standby state at a step 206.

Now, consideration will be given to the parallel processing of n arithmetic operations of a like nature by using n processors. For example, it is assumed that n is equal to 4 and the parallel processing is to be performed for the arithmetic operation given by the following expression:

$$y = G_1x_1 + G_2x_2 + G_3x_3 + G_4x_4 \quad (1)$$

Figure 8:
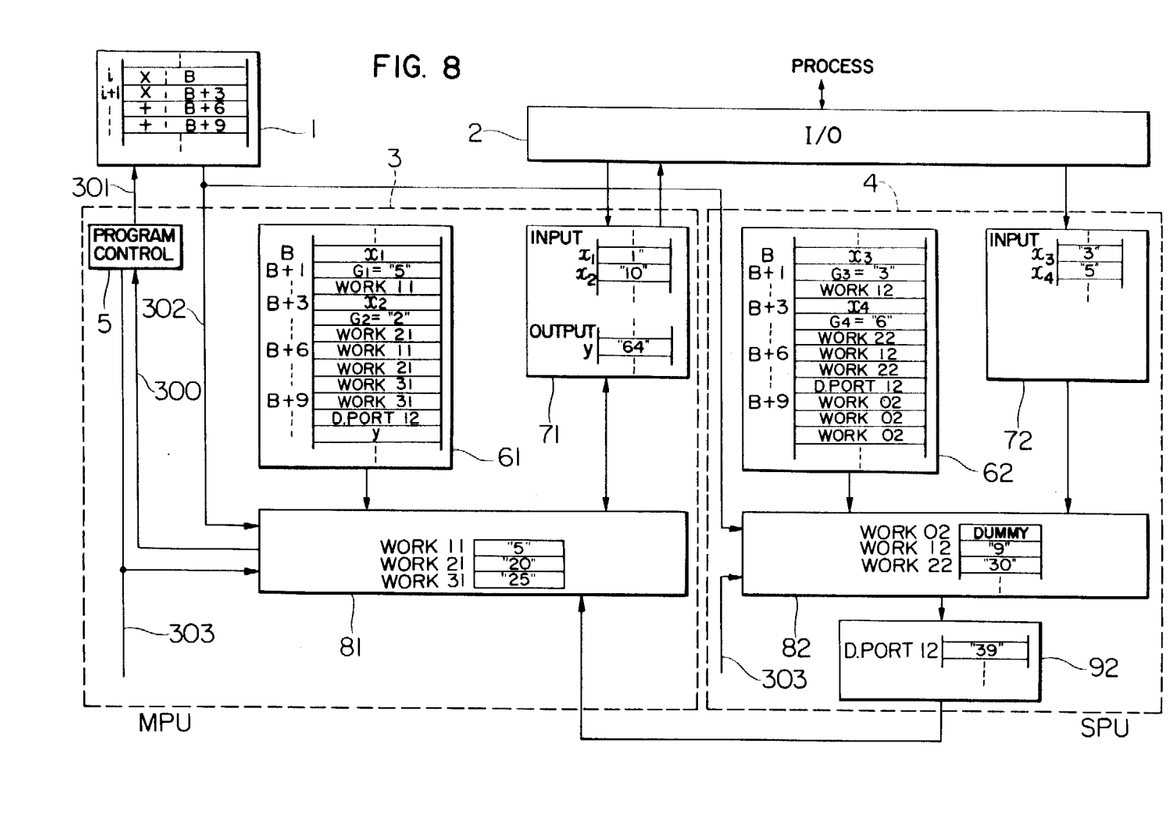
FIGS. 8 to 13 are views illustrating data storage locations and the flows of processings in the controller according to the invention.
Figure 9:
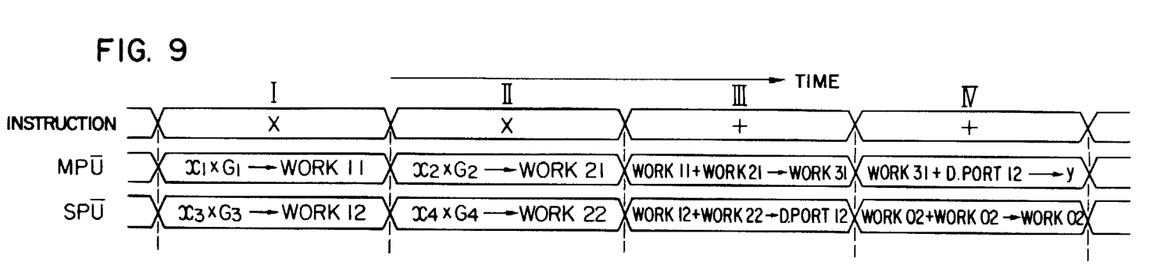

FIG. 8 shows data storage locations and data flows in the case where the above arithmetic operation is executed in accordance with the teaching of the present invention, while FIG. 9 shows in a time chart the processing procedures as a function of time. Further, FIGS. 10 to 13 illustrate locally the data locations and the data flows at each of the processing steps I to IV, respectively.

Referring to FIG. 8, the contents of the instruction memory 1 and the operand address memories 61 and 62 are previously stored in these memories as the programmed data. Input data $x_1$ to $x_4$ of the input/output buffer memories 71 and 72 are constituted by the process information which varies from time to time in dependence on the changes in the processes to be controlled. The input information is constantly transferred between the input/output device 2 and the buffer memories 71 and 72, whereby the process information stored in the input/output buffer memories 71 and 72 is updated from time to time. On the other hand, output information supplied from the processors 81 and 82 are temporarily written in the input/output buffer memories 71 and 72 and subsequently transferred to the input/output device 2.

Figure 10:
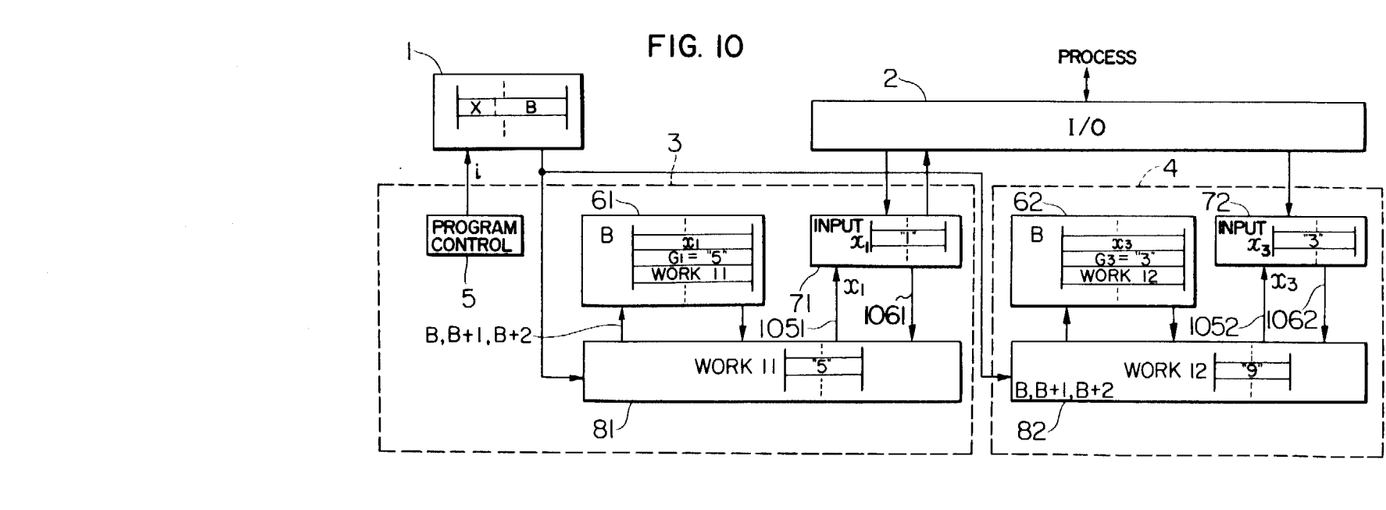

The processing of the arithmetic operation in accordance with the expression (1) is so programmed as to be executed at four steps in total, inclusive of two steps for addition and two steps for multiplication, as will be seen in FIG. 9. More specifically, at the step I, multiplications of $x_1 \times G_1$ and $x_3 \times G_3$ are executed in parallel by the MPU 3 and the SPU 4, respectively, the results of which are, respectively, stored in the registers WORK 11 and 12 incorporated in the processors 81 and 82, respectively. This operation is completed by executing once the basic operation described hereinbefore in conjunction with FIGS. 2 and 3. The contents of the memories relating to this execution (step I) are illustrated in FIG. 10. In more detail, in accordance with the instruction of the content "X, B" stored in the instruction memory 1 at the address i, the contents stored in the buffer memories 61 and 62 at the addresses $x_1$ and $x_3$ designated by the addresses B and B+1 of the operand address memories 61 and 62 are, respectively, multiplied by the constants $G_1(=5)$ and $G_3(=3)$ given by literals instead of the addresses, the results "5" and "9" of the multiplications being placed in the registers WORK 11 and 12 of the processors 81 and 82. The literal represents by itself the data given by the content of the address memory 61 or 62 rather than by designating the address of the buffer memory in which the real data is stored, and is conventionally employed in the computer technology for representing constants and characters.

Figure 11:
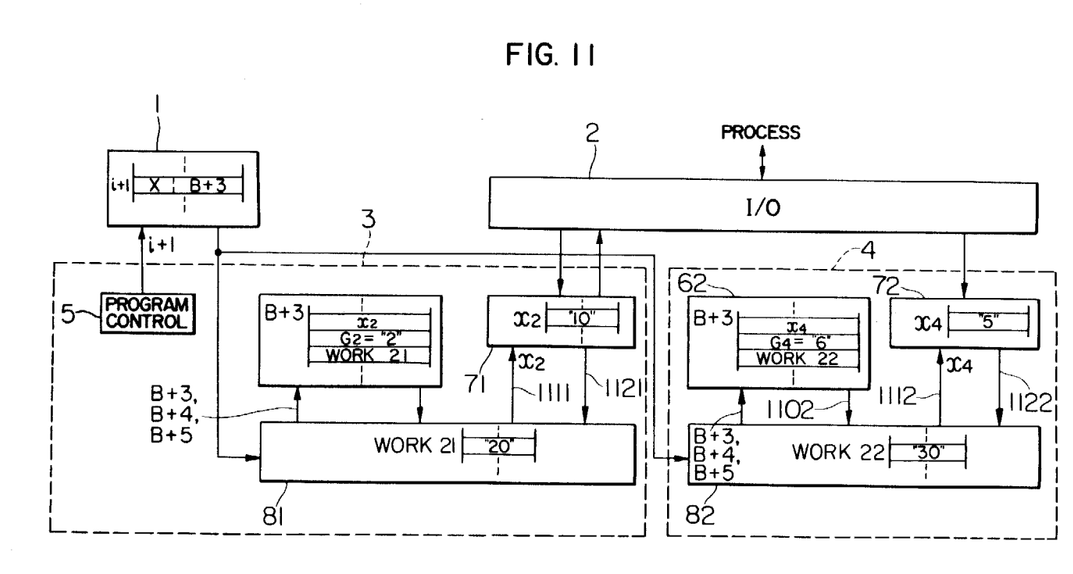

Upon completion of execution of the step I shown in FIG. 9, the program control means 5 issues to the instruction memory 1 a request that the succeeding instruction be read out from the next address (i+1), whereby the multiplications are performed in a similar manner at the step II. The data as well as the data flow at that time are shown in FIG. 11. Operations of $G_2x_2=20$ and $G_4x_4=30$ are executed in parallel by the MPU 3 and the SPU 4, respectively, the results of which are stored in the registers WORK 21 and 22, respectively.

Figure 12:
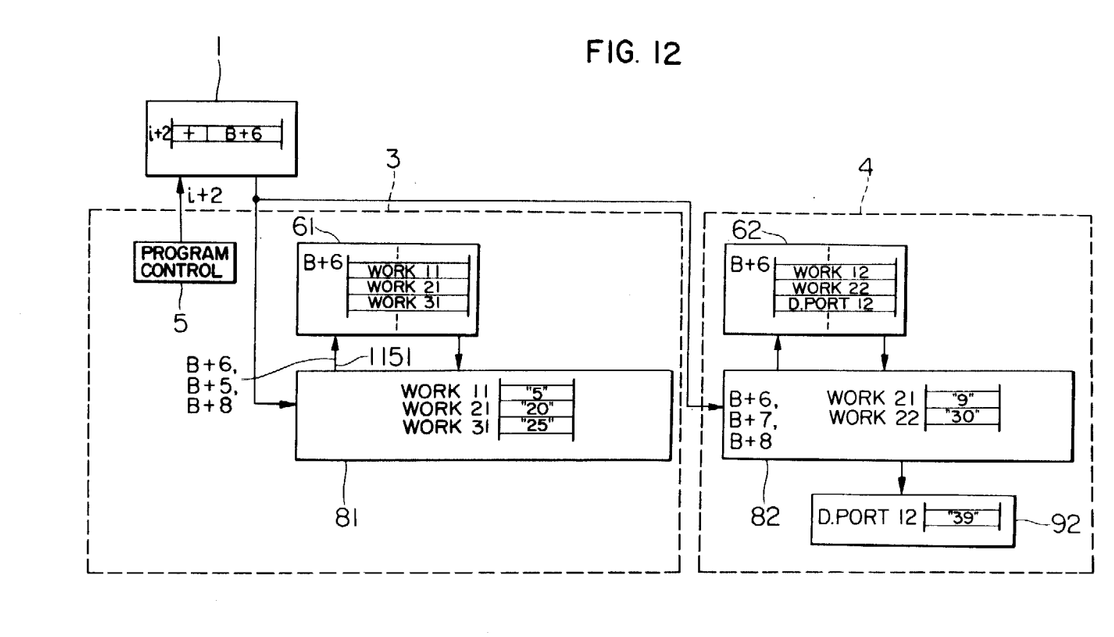

The processing performed at the step III of FIG. 9 is the same as that described hereinbefore in conjunction with the flow chart shown in FIG. 7. In the instant case, however, the contents of the registers WORK 11 and WORK 12 incorporated in the processor 81 are added together by the MPU 3, while the contents of the registers WORK 12 and 22 of the processor 82 are concurrently added together by the SPU 4. Accordingly, the contents at the addresses (B+6) and (B+7) of the address registers 71 and 72 represent only the addresses of the registers. Data and data flow at that time are shown in FIG. 12. While the result of the addition performed by the MPU 3 is stored in the register WORK 31, the result of the addition performed by the SPU 4 is stored at an address D. PORT 12 of the dual-port memory 92, to thereby allow the operation result of the processor 82 to be fetched by the processor 81 at the next step IV where the operation results of the processors 81 and 82 are added with each other.

Figure 13:
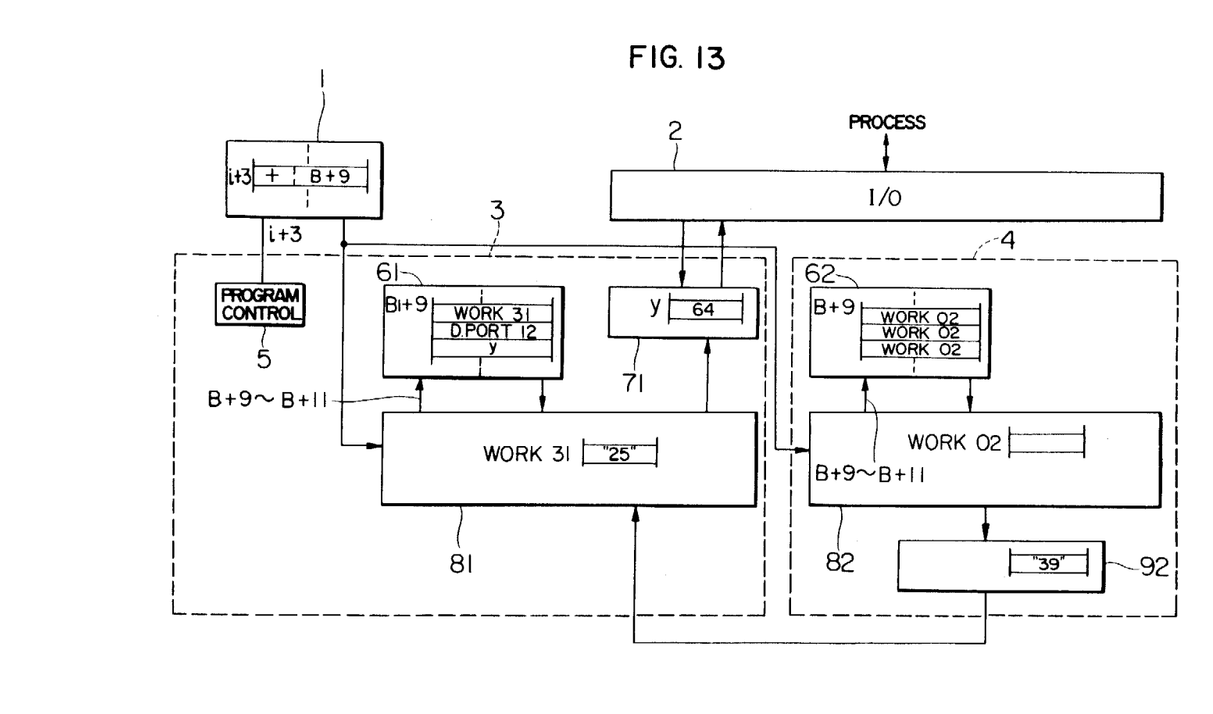

At the step IV, the results of the arithmetic operations performed by the processors 81 and 82 are added to determine y given by the expression (1), the result of which is then stored in the input/output buffer memory 71 at the address y and ultimately supplied to the processes under control by way of the input/output device 2. The data transfer between the input/output device 2 and the buffer 71 is carried out independent of the processor 81. In this connection, it is not preferable from the viewpoint of the transfer efficiency to transfer the data for all the addresses of the buffer memory 71. It is preferred to transfer the data only of the addresses used by the address memory 61. At the step IV, only the processor 81 performs the arithmetic operation. The processor 82 performs an invalid operation. To this end, a dummy work register WORK 02 is provided for performing the invalid processing. The results of the operations performed by the processors 81 and 82 are added and the result of the addition is stored again in the register WORK 02. Data as well as the data flow in this step IV are shown in FIG. 13.

In the foregoing, the operation of the exemplary embodiment of the invention has been described. In general, the processing of the processes to be controlled includes frequently regular repetitions of multiplications and additions. Accordingly, the embodiment of the invention can be realized in a simplified hardware structure, while the program as well as the control by the program can be correspondingly simplified. By increasing the number of the processors which perform processings concurrently in parallel with one another, the overall processing speed can be made high correspondingly. In case the MPU 3 and the SPU 4 shown in FIG. 1 are caused to perform processings of the same content, respectively, for the purpose of comparing the results of the processings with each other, accurate comparison can be readily made with high precision because the individual processing steps are executed perfectly in parallel or synchronism, as is illustrated in FIG. 9. Thus, a processing system of high reliability can be readily realized. In the application where the comparison mentioned above is intended, a common memory may be used for the operand address memories 61 and 62 to thereby simplify the hardware structure.

The data transfer among the input/output buffer memory, the input/output device and the processes under consideration can be effected in the manner disclosed in U.S. patent application Ser. No. 421005 U.S. Pat. No. 4,497,569.

We claim:

1. A digital controller for controlling a plurality of objectives to be controlled, which objectives are of the same kind, wherein a plurality of processors are provided in correspondence to said plurality of objectives, comprising:
   an instruction memory for storing instruction codes which are provided as a common control program for controlling said plurality of processors to execute said objectives, and addresses of storage locations holding operand addresses associated with said instruction codes;
   common control means connected to said instruction memory and said plurality of processors for reading out an instruction code and the associated storage location address from said instruction memory to all of said processors, and for generating a parallel execution process signal in each of said processors to effect execution of said instruction code in parallel by said processors;
   an operand memory provided in each of said processors, each operand memory having storage locations storing operand addresses, which storage locations are accessed by the same storage location address read out from said instruction memory; and
   an input/output data buffer memory provided in each of said processors and operatively associated with the operand memory therein for storing data accessed by the operand addresses stored in said operand memory;
   wherein a similar operation is carried out in each of said processors in parallel in response to the same instruction code read out from said instruction memory and data accessed from the input/output data buffer memory provided in each of the processors on the basis of the operand address which is obtained by accessing the operand memory with the storage location address associated with the instruction code read out of said instruction memory.

2. A digital controller according to claim 1, further including dual-port memories for outputting the results of said parallel processings, and local buses provided for each of said processors for coupling said processors to said dual-port memories, respectively, wherein the results of said processings performed by each of the processors are fetched by the other processors through said local buses.

3. A digital controller according to claim 1, wherein a storage location in the form of a dummy register is assigned in the operand memory in the processor for which no data is required for the parallel arithmetic processing.

* * * * *